H. L. PALMER.

Improvement in Apparatus for the Manufacture of Paste-Board.

No. 4,951. Reissued June 18, 1872.

Witnesses.
A. Rupprecht.
Rodolf Eils

H. L. Palmer
Inventor.
D. P. Holloway & Co
Attys

UNITED STATES PATENT OFFICE.

HENRY L. PALMER, OF STILLWATER, NEW YORK, ASSIGNOR TO EDWARD W. O'NEILL AND MAURICE FITZGIBBONS.

IMPROVEMENT IN APPARATUS FOR THE MANUFACTURE OF PASTEBOARD.

Specification forming part of Letters Patent No. 87,359, dated March 2, 1869; reissue No. 4,951, dated June 18, 1872.

Specification describing a new and useful Machine for Attaching Paper to Pasteboard such as is used in making paper boxes, invented by HENRY L. PALMER, of Stillwater, in the county of Saratoga and State of New York.

This invention relates to an improved machine for attaching white or colored paper to pasteboard, especially designed for lining pasteboard to be used in making paper boxes. This has heretofore been done by hand, the paper being applied in sheets, and the drying done by exposure to the atmosphere; the object of my invention being to expedite the process, substitute mechanical for manual labor, and to dry the pasted sheets under pressure, so that it is not liable to become warped or rough. This invention consists in a novel arrangement of pasting, compressing, and drying cylinders, whereby I am enabled to apply paper in a continuous sheet and leaving its surface covered with an uniform film of paste to sheets of straw-board, the two being united by compression, and then dried by passing between drying-cylinders. The special points of novelty will be hereinafter indicated.

Figure 1:
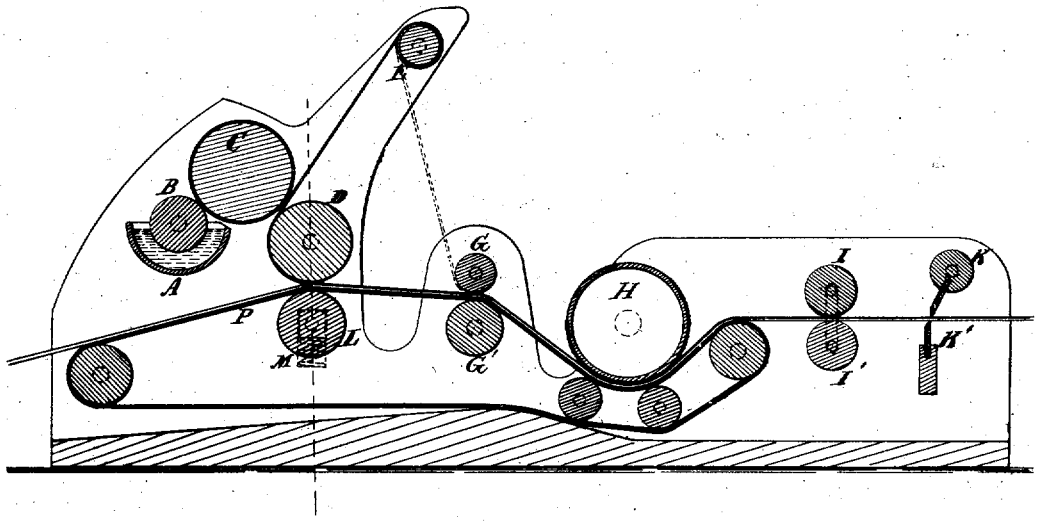
Figure 2:
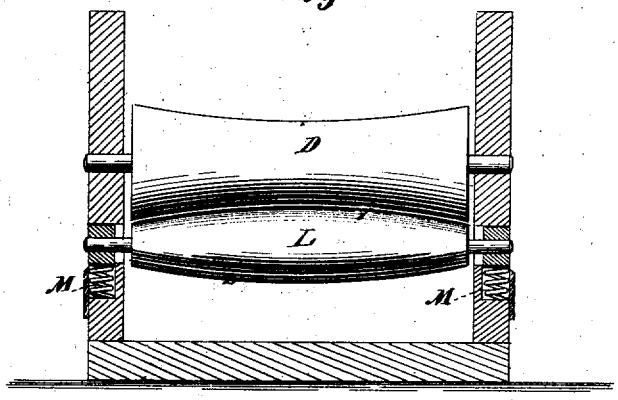

In the annexed drawing, Figure 1 is a vertical, central, and longitudinal section of the machine, and Fig. 2 is an elevation of the concave and convex rollers.

The same letters are employed in both the figures in the designation of identical parts.

A is a trough containing the paste employed for uniting the sheets. A roller, B, revolves in this trough for taking up the paste and applying it to the distributing-roller C, which revolves on its own periphery resting on the paste-roller B and on the roller D, by its frictional contact with which, or with the paper passing between them, it derives motion. The paper to be applied as lining is carried on the roll E, and passes between the rollers C and D, receiving the paste on its surface from contact with roll C. The pasteboard is fed onto an endless apron, (preferably of felt,) F, running upon suitable rollers. When the sheet of lining-paper and pasteboard pass between the rollers D and L they are made to unite. The roller M is elastic, so as to accommodate itself to different thicknesses of the board. This may be effected by supporting its lower journal-boxes upon springs M M, which will yield as much as may be required, and by their tension maintain an uniform pressure against the sheets. The united sheets are then carried with the felt apron between other rolls G G′, by which they are again pressed together, and then they are carried under a drying-cylinder, H, by the heat of which the paste will be dried. The united sheets then pass between calender-rolls I I′, and then between knives K K′, by which they are cut into the desired forms. As the drying, calendering, and cutting mechanism are in common use in paper-machines it is not necessary to describe them herein more fully. The rolls B, C, D, and L, I prefer to construct, respectively and alternately concave and convex, for the purpose of giving convexity to the sheets of paper when united, to provide against the shrinkage of the lining-sheet which is wet with the paste. But this feature is not regarded as essential, and these rolls may all be made cylindrical. The paste may be applied to the surface of the pasteboard instead of the lining-paper, by bringing the paper from the roll E immediately under the roll G, as indicated by the dotted lines. In this case the paste from the roller C will be transferred to D, and by it applied to the upper surface of the pasteboard, and the adhesion caused by passing both sheets between the rolls G G′.

What I claim as my invention, and desire to secure by Letters Patent, is—

1. In combination, a compressing paste-distributing roller, and a roller, D, between which the paper is passed, substantially as set forth.

2. In combination with a paste-roller, a compressing distributer for regulating the supply of paste, and a roller, D, for supporting the paper against the surface from which it takes the paste.

3. In combination with a paste-roller, a compressing distributing-roller and roller D, between which the sheet is passed to receive a film of paste, an endless apron for carrying the board, and compressing-rollers for causing the surfaces of the paper and straw-board to adhere.

4. In combination with mechanism for applying a film of paste to the surface of the paper, an endless apron, compressing-rollers, for uniting the sheets, and drying-cylinders.

5. In combination with the paste-applying devices, convex and concave rollers, as and for the purpose set forth.

6. In combination with the pasting, compressing, and drying rollers, a knife for cutting the sheets.

In testimony whereof I have signed my name to the foregoing specification in the presence of two subscribing witnesses.

H. L. PALMER.

Witnesses:

WM. H. BUTTERWORTH,

GEO. LYONS.